US008805704B2

(12) United States Patent
Lewis et al.

(10) Patent No.: US 8,805,704 B2
(45) Date of Patent: Aug. 12, 2014

(54) INDEX AND RISK-LINKED REINSURANCE PRODUCT

(75) Inventors: Christopher M. Lewis, Tolland, CT (US); Richard L. Alleyne, West Hartford, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 1282 days.

(21) Appl. No.: 11/977,897

(22) Filed: Oct. 25, 2007

(65) Prior Publication Data

US 2008/0103841 A1 May 1, 2008

Related U.S. Application Data

(60) Provisional application No. 60/855,034, filed on Oct. 27, 2006.

(51) Int. Cl.
*G06Q 40/08* (2012.01)

(52) U.S. Cl.
USPC ................................................. 705/4; 705/35

(58) Field of Classification Search
None
See application file for complete search history.

(56) References Cited

U.S. PATENT DOCUMENTS

| 5,842,148 | A | 11/1998 | Prendergast et al. |
| 6,049,773 | A * | 4/2000 | McCormack et al. ............ 705/4 |
| 6,321,212 | B1 | 11/2001 | Lange |
| 7,389,262 | B1 | 6/2008 | Lange |
| 7,580,872 | B2 * | 8/2009 | Van Slyke et al. ............. 705/35 |
| 2003/0033261 | A1 | 2/2003 | Knegendorf |
| 2003/0135395 | A1 | 7/2003 | Carfi |
| 2004/0064391 | A1 | 4/2004 | Lange |
| 2004/0186753 | A1 | 9/2004 | Kim et al. |
| 2005/0216386 | A1 * | 9/2005 | Klugman ........................ 705/35 |
| 2005/0261943 | A1 | 11/2005 | Quarterman |
| 2006/0173720 | A1 * | 8/2006 | Berens et al. ...................... 705/4 |
| 2007/0112604 | A1 | 5/2007 | Caballero |
| 2007/0214023 | A1 * | 9/2007 | Mathai et al. ..................... 705/4 |
| 2009/0024543 | A1 * | 1/2009 | Horowitz et al. ............. 705/400 |

OTHER PUBLICATIONS

Doherty, N. A. & Richter, A. Moral hazard, basis risk and gap insurance. Journal of Risk and Insurance, 69(1), 9-24.*
Pelletier, Eveline, The transfer of catastrophe risk to the capital marketsover the 1990s: an analysis of the process, A thesis in the faculty of commerce and adminstraiton, Concordia University, Montral, Quebec, Dec. 2000.*

* cited by examiner

*Primary Examiner* — Rajesh Khattar
*Assistant Examiner* — Carol See
(74) *Attorney, Agent, or Firm* — Howard IP Law Group, PC (57) ABSTRACT

Disclosed is a novel insurance product that provides additional reinsurance coverage to mitigate risks associated with catastrophic events which adversely affect property and casualty insurance rates. The reinsurance product contains one or more tiers of protection which allows a purchaser to vary the coverage related to one or more catastrophic events, such as an earthquake, a hurricane, or a flood.

25 Claims, 7 Drawing Sheets

INDEX AND RISK-LINKED REINSURANCE PRODUCT

CROSS-REFERENCE TO RELATED APPLICATIONS

This application claims priority to application Ser. No. 60/855,034, filed Oct. 27, 2006.

FIELD OF THE INVENTION

The present invention generally relates to the field of insurance. More specifically, the present invention relates to an index and risk linked securitization structure.

BACKGROUND OF THE INVENTION

Individuals purchase insurance products to provide financial security in the event of accidental property damage to their homes, automobiles and other non-financial assets. For example, in purchasing a standard homeowners policy, an individual homeowner pays an insurance premium in exchange for an insurance policy that provides compensation for accidental losses or damage to the individual's residence caused by such events as fire, wind damage, and other events causing structural damage.

Businesses typically purchase property and casualty ("P&C") insurance products to insure against financial losses in the instance of accidental property damage as well as against other liabilities. Consequently, there are a variety of different types of P&C insurance products available for individuals and companies to purchase to provide protection from a loss.

In general, the less risk is entailed in insuring a given property, the cheaper it is to obtain P&C insurance. Conversely, it is more expensive for an individual or business to purchase these types of policies for a property facing a higher risk of damage. This is a direct result of the fact that the premium payments of insurance products are directly related to the likelihood and severity of a loss. Typically, insurers utilize actuarial data to determine the risks entailed in insuring a given property. The insurer utilizes this data as a key input in determining an appropriate premium amount to charge the policyholder.

However, in the case of low frequency and high severity catastrophe events (events that are sufficiently wide in scope to impact a large number of policyholders at one time), traditional data may not sufficiently account for the risk of certain catastrophic events that could inflict damage to a property and, hence, losses to the properties underlying insurance policy. Examples include war, hurricanes, earthquakes, floods, tornadoes, terrorism, etc. These events, which have devastating effects, are difficult to predict with any degree of accuracy. Accordingly, insurers bear additional risks.

In an effort to ameliorate the effects of this additional risk, insurers utilize a variety of different techniques to manage and finance these risks. For example, insurers often utilize exposure limits and strict underwriting standards to control the overall magnitude of the risk at the insurance company. At the same time, insurers use a variety of methods to finance the catastrophe risks that remain, including traditional reinsurance, risk-linked securities, debt, equity, and hybrid capital structures. Reinsurance is a means by which an insurance company ("cedant" or "ceding insurer") can protect itself against the risk of loss on underlying insurance policies by transferring a portion of the risk on these policies, along with a reinsurance premium, to another insurer ("reinsurance company"). Reinsurers, in short, provide insurance to insurance companies.

There are many reasons an insurance company will choose to utilize reinsurance as part of its responsibility to manage a portfolio of risks for the benefit of its policyholders and investors. The main use of reinsurance is to allow the ceding company to protect the solvency of the company against an accumulation of claims associated with a catastrophic event—ensuring that policyholders can be repaid after a large loss. Reinsurance can improve an insurance company's balance sheet by reducing the amount of net liability, and thereby increasing surplus. Surplus, assets less liabilities, is roughly the same as shareholder equity on a balance sheet of a non-insurance company.

There are several types of reinsurance. Proportional reinsurance involves one or more reinsurers taking a stated percent share of each policy that an insurer produces ("writes"). This means that the reinsurer will receive that stated percentage of each dollar of premiums and will pay that percentage of each dollar of losses.

Proportional reinsurance may have a variety of implementations. One such implementation is known as the quota share structure. When a quota share structure is used, the reinsurer assumes responsibility for a predetermined percentage of the benefit amount, rather than a predetermined amount. In exchange, the reinsurer receives a predetermined percentage of the premiums and losses received by the primary insurance provider. Thus, the primary insurer will experience an increase in the net amount of retained commission, since the decrease in capital is less than the decrease in liability.

Another implementation of proportional reinsurance is known as the surplus share structure. Under the surplus share structure, the reinsurer bares responsibility for risk based on a variable percentage rate above the insurer's retention limit, but no more than a predefined amount. The insurer receives a commission for an agreed upon share in the received premium. The amount retained by the primary insurer is referred to as a line and is defined in terms of a specific amount. Under the surplus share structure, the reinsurer and primary insurer share based on a predetermined percentage basis, any exposure which is greater than the retention limit of the primary insurer. The divisions of both premiums and liability between the primary insurer and reinsurer are based on a variable percentage for the entire portfolio; this is because a distinct retention amount may be chosen for each policy.

Non-proportional reinsurance, also known as excess of loss reinsurance, only responds if the loss suffered by the insurer exceeds a certain amount, called the retention. An example of this form of reinsurance is where the insurer is prepared to accept a loss of $1 million for any loss which may occur and purchases a layer of reinsurance of $4 m in excess of $1 million—if a loss of $3 million occurs the insurer pays the $3 million to the insured(s), and then recovers $2 million from their reinsurer(s). In this example, the insurer will retain any loss exceeding $5 million unless they have purchased a further excess layer (second layer) of say $10 million excess of $5 million.

However, with limited capacity to provide such coverage in the traditional reinsurance market, primary insurance companies have increasingly turned to an alternative to traditional reinsurance for financing the risk of large catastrophe losses—the transfer of the risk directly to capital market investors through the risk-linked securities market.

Traditional catastrophe excess of loss reinsurance policies typically cover several underlying risks or "perils" (e.g., hurricane, earthquake, etc.), but only provide cover on a single event or per occurrence basis, whereby the reinsurance provides compensation for 1 (2 if the reinsurance includes a reinstatement provision) individual loss events and not an accumulation of multiple loss events. Considerably less common is a form of catastrophe reinsurance known as aggregate annual excess of loss catastrophe reinsurance where the policy provides compensation for an accumulation of events during the course of a calendar year.

In purchasing a reinsurance policy, a ceding insurance company is purchasing a promise by the reinsurance company to compensate the insurer for losses sustained in the aftermath of a catastrophic event. For extremely large losses, however, the same events that give rise to solvency concerns at primary insurance companies, and caused the company to consider purchasing reinsurance, can stress the payment capacity of reinsurance companies. As a result, primary insurance companies have increasingly turned to an alternative to traditional reinsurance for financing the risk of large catastrophe losses—the transfer of the risk directly to capital market investors through the risk-linked securities market.

In a risk-linked securities transaction, the primary insurance company cedes catastrophe risk to a special purpose reinsurance company in a similar form as a traditional excess-of-loss reinsurance contract. In contrast to traditional reinsurance, however, the special purpose reinsurance company finances 100% of the risk embedded in the reinsurance contract through the issuance of bonds ("catastrophe bonds") to qualified institutional investors or buyers ("QIBs"). In return for their investment of principal, which remains at risk to pay losses under the reinsurance contract during the coverage period, investors earn an interest rate equal to the London Interbank Offer Rate (Libor) plus the rate-on-line on the reinsurance coverage. The investment of principal, which equals the coverage limit provided to the ceding insurer, is deposited in a trust to collateralize the reinsurance provided to the ceding insurance company—ensuring that funds are available to the ceding insurer should an event create a loss under the reinsurance transaction. As a result, the ceding insurer purchases an excess-of-loss reinsurance contract without the credit risk associated with a traditional reinsurance contract.

The first risk-linked security transactions in the property-casualty industry date back to the mid-1990s, when several insurance companies issued "Act-of-God" bonds. (See for example, Lewis and Davis (1998), "Capital Market Instruments for Financing Catastrophe Risk: New Directions", *Journal of Insurance Regulation*, Winter 1998 (17, 2), pps. 110-133. Moreover, the securitization of insurance risks has followed the development of securitization structures (e.g. program shelf structures) in other markets. See for example, Cummins, J. David and Christopher M. Lewis, Securitized Risk Instruments as Alternative Pension Fund Investments," in ed. Mitchell, Olivia and Kent Smetters, The Pension Challenge: Risk Transfers and Retirement Income Security, Pension Research Council, Oxford University Press, December 2003.)

SUMMARY OF THE INVENTION

The basic structure of the customized-index reinsurance coverage pioneered by The Hartford in 2004 in the Foundation Re transaction is to use individual state and individual line-of-business payout factors, along with a set of algorithms and procedures, that, when multiplied against reported or modeled industry losses, closely replicate the loss experience of an individual insurance company's portfolio of property-casualty insurance. The present invention extends the basic structure of this customized-index approach, as well as the shelf structure used to access new reinsurance coverage through the special purpose reinsurance company in many dimensions.

The current invention allows the ceding insurer to purchase coverage for various combinations of geographic region and/or line of business coverage using the same shelf structure by simply setting payout factors to zero for any coverage combinations not desired by the ceding insurer prior to issuance.

The current invention allows the ceding insurer to dynamically adjust the individual state and line of business payout factors annually during the life of the coverage, subject to certain limitations, from the original value so as to more closely manage the basis risk of the coverage as industry and company exposure data changes. The original customized-index reinsurance structure locked the payout factors throughout the life of the coverage at their initial values.

The present invention also extends the basic per occurrence nature of customized-indexed catastrophe bonds to aggregate excess-of-loss reinsurance, written as an aggregate annual cover or a cumulative multi-year coverage, with aggregate retentions and limits. While aggregate reinsurance coverage has been obtained through risk-linked security transactions on an indemnity basis, this invention extends the concept of aggregate excess-of-loss reinsurance and the customized-index approach to create a new innovation in reinsurance coverage.

Also included in the invention, both with respect to per occurrence and aggregate excess-of-loss reinsurance, is that the terms of the reinsurance may or may not include various features that alter the terms of coverage. These terms include, but are not limited to, per event loss contribution limits, franchise deductibles, per event loss deductibles, knock-out or knock-in loss provisions, adjustments to reflect net vs. gross insurance company exposure, and adjustments for non-modeled losses such as automobile losses or loss adjustment expenses.

The current invention also provides additional classes of coverage, including coverage for losses from U.S. tornado and/or hailstorm events, alone or in combination with coverage for hurricane and/or earthquake insured losses. To date, no risk-linked securities transaction in the United States has included the separate peril of U.S. tornado and/or hailstorm. This current invention is the first structure to provide a commercially viable definition of U.S. tornado-hailstorm event on an index basis. The definition leverages both the definition of PCS Wind and Thunderstorm Events and PCS Winter Storm Events, where the latter is limited to the losses in states that experience qualifying severe weather (as defined by 5 or more tornado and/or hail storm reports within each state by the National Weather Service).

Further, the invention is the first to utilize measurable physical parameters by state or other geography in combination with reported industry losses and/or indexed losses and/or PCS loss classifications by state/region and line of business relative to a predetermined loss threshold to define a given covered event (e.g., U.S. tornado/hailstorm losses within PCS Winter Storm events).

The invention also extends the customized index structure, for either occurrence or aggregate excess-of-loss reinsurance, by combining parametric factors with the individual state and line-of-business payout factors to define sub-state payout factors for any given line of business. This innovation of a parametric-index structure is critically valuable for ceding companies in that the structure allows firms to manage portfolio replications at a finer level of geographic resolution—minimizing basis risk and providing an enhanced securitization product.

An object of the present invention is to provide an insurance product which utilizes one or more risk classes consisting of the perils of wind and thunderstorm, tornado and/or hailstorm, and tornado and/or hailstorm as part of winter storm losses, with respect to each coverage, individually or in combination with other perils such as hurricane and/or earthquake in the United States.

Still another object of the present invention is to provide a method wherein a customized index trigger structure by state and line of business is further modified to allow for a set of payout factor weights at a sub-state level for a specific class of risk through the utilization of one or more trigger criteria defined by reference to a combination of measurable physical parameters meeting a pre-determined impact threshold.

Another object of the present invention is to provide a system capable of issuing new classes whether or not an event notice has been triggered on an existing outstanding class of risk.

Yet another object of the present invention is to provide a system capable of issuing event notices and take actions related to one particular coverage but not all coverages at the same time.

Further, it is an object of the present invention to provide a method for qualifying an event for consideration within a customized index structure with reference to both insured industry losses within a state and with reference to a combination of measurable physical parameters meeting a predetermined impact threshold.

Another object of the present invention is to provide a reinsurance product wherein each defined event may or may not be subject to minimum and/or maximum industry loss thresholds and may or may not be subject to a per event loss contributing limits defined in industry insured loss or index loss amounts on an occurrence or aggregate excess-of-loss basis.

It is a further object of the present invention to provide a method of utilizing a shelf distribution mechanism that provides a flexible platform for purchasing various forms of aggregate annual reinsurance protection under differing terms and conditions and at times that may or may not coincide with the quarterly payment dates on the shelf.

Another object of the present invention is to provide a method for utilizing a web-enabled electronic platform to distribute documents and materials to investors related to risk-linked securities offerings and to disseminate information to investors regarding the operation and performance of the securities following the distribution of the securities.

It is the object of this invention to provide for a series of methods, procedures and analytics for estimating and designing the payout factors, in combination or separate from parametric adjustments, to create a replicating portfolio and to measure the basis risk inherent in the coverage structure. The invention also includes the methods, procedures, and analytics for dynamically adjusting payout factors over time on any existing coverage to reflect changes in industry and company exposure data and other factors pertinent to the underlying industry and/or company loss/exposure profiles.

Further, the current invention includes the flexibility to allow the payout factors, however defined, to change during the course of the coverage period within defined limits and defined reset intervals so as to allow the ceding insurance company to dynamically manage basis risk as both industry exposures and company exposures change over time.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

DETAILED DESCRIPTION OF THE PREFERRED EMBODIMENT

A detailed illustrative embodiment of the present invention is disclosed herein. However, techniques, systems and operating structures in accordance with the present invention may be embodied in a wide variety of forms and modes, some of which may be quite different form those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention.

Moreover, well known methods, procedures, and substances for both carrying out the objectives of the present invention and illustrating the preferred embodiment are incorporated herein but have not been described in detail as not to unnecessarily obscure novel aspects of the present invention.

None of the terms used herein, including "property and casualty," "P&C," "product," "P&C insurance policy," "policy," "P&C insurance," "insurance policy," "insurance product," "insurance instrument," and "P&C insurance product" are meant to limit the application of the invention. The terms are used interchangeably for convenience and are not intended to limit the scope of the invention.

Additionally, the terms "catastrophic bonds," "risk-linked securities," "non-traditional reinsurance," "alternative risk transfer," and "insurance linked securities" are not meant to limit the application of the invention. The terms are used interchangeably for convenience and are not intended to limit the scope of the present invention. Similarly, the use of the terms "individual," "purchaser," "client," "insured," "insured individual" and "corporation" are not meant to limit the scope of the invention to one type of entity, as any entity or individual can also utilize the present invention. The following presents a detailed description of a preferred embodiment of the present invention.

Finally, none of the terms used herein, including "insurance provider," "company," "insurance company," "insurer," "insurance carrier," "ceding insurer," "policy issuer," and "insurance institution" are meant to limit the application of the invention. The terms are used interchangeably for convenience and are not intended to limit the scope of the invention.

New issuance volume in the risk-linked securities market remained relatively modest, for several key reasons. First, traditional reinsurance was generally available and attractively priced. Second, since capital market investors generally do not possess the same underwriting experience as traditional reinsurance firms, access to the risk-linked securities market on an indemnity basis (i.e., where the reinsurance contract is written directly on the losses of the ceding insurance companies portfolio) was limited to large, highly rated insurance and reinsurance companies with relatively standardized underlying insurance policies. Third, the methods and tools available that would allow ceding insurance companies to access the risk-linked securities market using an indexed or parametric structure, where the reinsurance compensates the ceding insurer using observable market indices or event parameters that closely replicate the underlying insurer's portfolio losses were in their infancy. The problem for insurers was that, absent this technology, recoveries on reinsurance structured using an index or parametric trigger could differ materially from the recoveries that would be received under an indemnity reinsurance contract—a difference known as basis risk.

Then, the factors underlying each of these dampening influences on the risk-linked securities markets changed. First, following large losses associated with the hurricanes, reinsurance capacity became scarce and relatively expensive. Second, with bond spreads compressing in other asset classes, an increasing supply of capital market investment was evident in the market—expanding the opportunities for securitization. Third, the Hartford brought to market a new innovation in index-based reinsurance with the launch of the original Foundation Re transaction.

The key innovation in the original Foundation Re structure was the ability to use combinations of individual state and line-of-business "payout factors" on total industry losses to create a replicating portfolio that closely matches the loss recoveries that an insurance company would expect on an indemnity basis. Foundation Re provided The Hartford with a shelf program for obtaining this coverage on a customized-index basis, against the perils of hurricane, earthquake, hurricane and earthquake, and medium-sized hurricanes or earthquakes in the year following a large hurricane or earthquake event, all on a single-occurrence basis. Moreover, while multi-class shelf programs were used in insurance securitization, and are well established in other securities markets, Foundation Re represented the first shelf offering by a primary insurance company looking to gain regular access to the securitization market.

The confluence of these factors resulted in a dramatic increase in new issuance volume of risk-linked securities transactions. New issuance volume surged to a record of over $4.5 billion in 2006.

Therefore, one embodiment of the present invention comprises a catastrophic event insurance product with a variety of different classes of reinsurance coverage, all of which are indexed by state and line of business to industry losses. As described in greater detail below, the preferred embodiment of the present invention utilizes seven different classes of coverage, protecting against a variety of catastrophic events such as hurricanes, earthquakes, tornadoes, hailstorms, and combinations thereof.

The present invention may be structured to utilize an excess of loss agreement. When an agreement for excess of loss reinsurance is established, the liability for coverage is divided among reinsurers in a non-proportional fashion, based on the amount of received claims. Under an excess of loss agreement, the reinsurer is liable for losses above a specified amount, but not above a preset limit. The coverage under such an agreement may be limited to a single occurrence, or conversely, to a set of events. Additionally, an excess of loss agreement may feature a deductible amount, especially at the upper layers.

The excess of loss agreement allows an insurance carrier to provide coverage for severe catastrophes which carry a high damage cost but have a low probability of occurrence, without putting the primary insurer at risk of severe financial losses in such an event. Although excess of loss agreements would generally be used for coverage of catastrophes with anticipated high damage costs, it is also conceivable that an excess of loss agreement may be used to insure against smaller property and casualty damage as well.

Furthermore, in some implementations of the present invention, several reinsurers may participate in a single excess of loss agreement, namely by providing coverage for losses extending above a specific amount but no more than a predetermined maximum amount. This concept is referred to as vertical layering.

Figure 1:
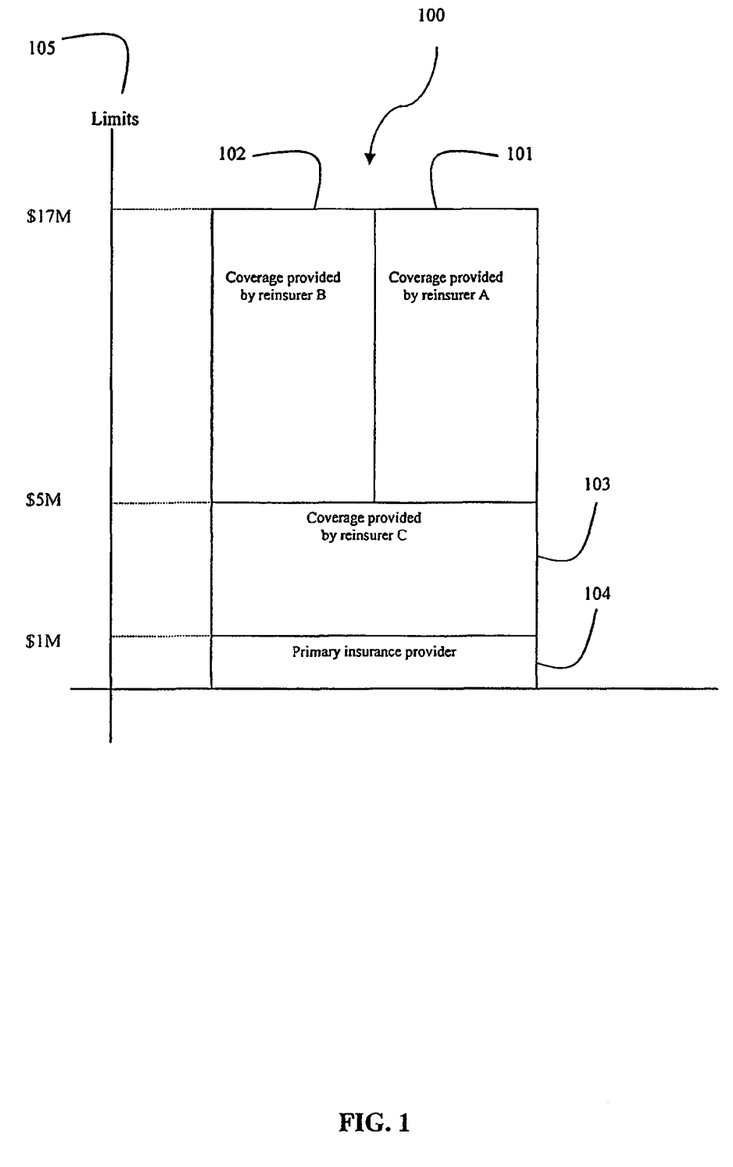
FIG. 1 is a graph depicting the liability distribution for an excess of loss agreement in accordance with an embodiment of the present invention.

FIG. 1 depicts an excess of loss agreement chart 100. Different reinsurers may assume a portion of responsibility within the same upper and lower liability limits 105, as shown in the liability distribution for an excess of loss agreement chart 100, this concept is referred to as horizontal layering. For example, reinsurer A assumes responsibility for half of damages exceeding $5 m but no more than $17 m 101, while reinsurer B will provide coverage for the other half of damages exceeding $5 m but no more than $17 m 102. In this scenario reinsurer C assumes responsibility for damages exceeding $1 m but no more than $5 m 103, where as the primary insurance provider will provide coverage for any damages not exceeding $1 m 104.

Several examples of the types of possible excess of loss agreements are:

Multiple catastrophes per incident—Provides the primary insurer with coverage for losses associated with multiple catastrophic occurrences. In this event, an incremental deductible may be employed.

Property per risk—Gives coverage for each type of risk, for losses which exceed a specific amount.

Stop loss—Provides indemnification for losses exceeding a predetermined loss ratio or a specific predetermined amount.

Aggregate—Provides coverage for an accumulation of losses meeting the terms of the treaty during the period of coverage.

Figure 2:
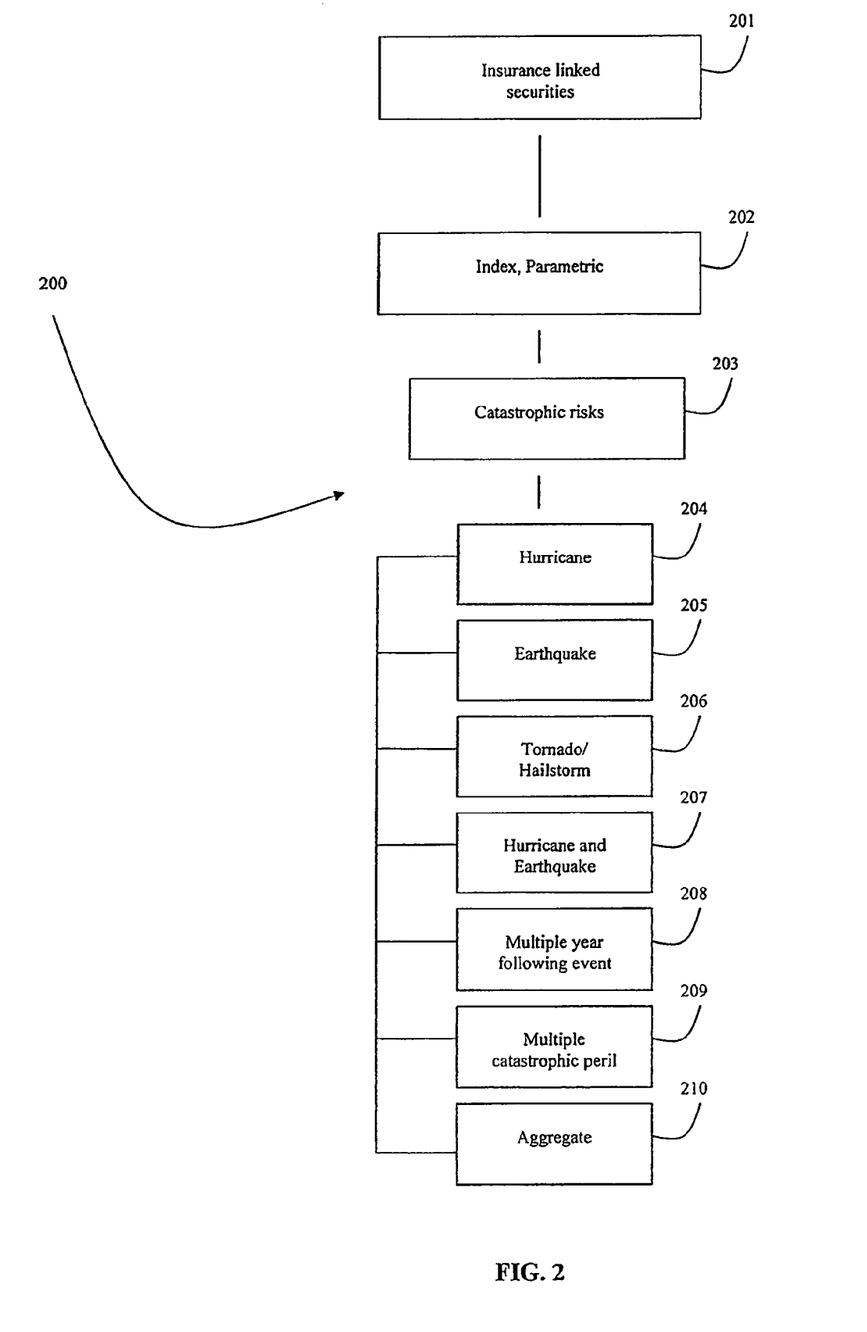
FIG. 2 is a chart depicting the different classes of coverage in accordance with an embodiment of the present invention.

FIG. 2 shows the structure chart of the different classes of coverage 200. When structuring the reinsurance coverage provided by the present invention the preferred embodiment utilizes seven different coverage classes of insurance linked securities 201. The insurance linked securities 201 are indexed 202 by state and line of business to industry losses, namely by the risks involved in each class of coverage of catastrophic risks 203. In the preferred embodiment, the seven classes are as follows:

Class A: First and subsequent event hurricane coverage 204 in the covered area.

Class B: First and subsequent event earthquake coverage 205 in the covered area.

Class C: First and subsequent event tornado/hailstorm coverage 206 in the covered area.

Class D: First and subsequent event hurricane and earthquake coverage 207 in the covered area.

Class E: First and subsequent event coverage 208 in the calendar year following an activation event for hurricane and earthquake in the covered area. The activation event is the first event hurricane or earthquake loss in excess of the activation event trigger.

Class F: First and subsequent event hurricane, earthquake, and tornado/hailstorm coverage 209 in the covered area.

Class G: Annual aggregate hurricane, earthquake, and tornado/hailstorm coverage 210 in the covered area.

It will be appreciated by those of ordinary skill in the art that any number of different combinations of catastrophic events can be utilized in accordance with the present invention. Further, as is known in the art, the reinsurance contract can contain provisions related to the definition of certain key terms. In the preferred embodiment, the definitions for some of the key terms are as follows:

Earthquake—Any event that is identified and assigned a number by the appropriate agency as a "catastrophe," where the perils identified by the agency with respect to such catastrophe include the peril of earthquake.

Hurricane—Any event that is identified and assigned a number by the appropriate agency as a "catastrophe," where the perils identified by the agency with respect to such catastrophe include the peril of hurricane.

Tornado/Hailstorm—Any event that is identified and assigned a number by the appropriate agency as a "catastrophe", where the storm family identified by the agency is either a "wind and thunderstorm event" with the secondary perils of tornado and/or hailstorm, or a "winter storm" with the secondary perils of tornado and/or hailstorm. Provided, however, that if the storm family identified by the agency is a winter storm and qualifying severe weather (i.e., 5 or more tornado and/or hail events) identified by the national weather service reports did not occur in an affected state in the covered area, the payout factors for such a state for such an event shall be zero.

The covered areas for the classes in the preferred embodiment are as follows:

With respect to hurricane events: Pre-defined hurricane states in the East, as well as Gulf States (and adjacent states) in the United States.

With respect to earthquake events: Continental US, excluding Hawaii and Alaska.

With respect to Tornado/Hail events: Continental US, excluding Hawaii and Alaska.

With respect to Classes D, E, F and G, the sum of covered areas identified with respect to each peril.

The payout factors for any given state or line of business may be set to zero for any state at the commencement of the coverage to provide coverage for a subset of the initial Covered Area.

It will be appreciated by those of ordinary skill in the art that any definition can be accorded the preceding terms as long as they are not inconsistent with standard insurance definitions.

The present invention utilizes an event index value to determine whether coverage is triggered for each specific subclass. In the preferred embodiment, for Classes A-F, the basic index structure is measured as follows:

$$EIV = (1 + \alpha) * \left( \sum_s \Pi_s I_s^P + \sum_s \chi_s I_s^C \right)$$

Where I indexes loss by state, p refers to personal lines, c refers to commercial lines, $\alpha$ is the auto load factor and $\Pi$ and $\chi$ are the optimized factor proportions for the insurance provider for each state(s) and line of business (p&c) for a given peril and series.

The factor proportions are selected so as to minimize the sum of squared errors between company losses and modeled industry losses in the area of subject losses (e.g., losses with a return period between 100 and 350 years), while at the same time meeting a statistical criteria to minimize basis risk across the entire structure.

For any given event, if the estimated index value exceeds a pre-stated trigger for each given series, the coverage will be activated based on the coverage terms in the applicable pricing supplement, with the payout structure as determined by applicable payout factors. For illustrative purposes an exemplary payout structure is depicted in table 1 below.

Foundation Re, Transaction Structure
Illustrative Event Index Loss and Bond Payment Calculation
Hurricane Event in First Year: $92.6 Billion Industry Losses assuming
$45% of 400MM transaction xs $1,350

| State | Industry Loss ($BN) | Payout Factor | Index Loss ($MM) |
|---|---|---|---|
| Personal Lines | | | |
| Alabama | $ 5.5 | 0.3167% | $ 17.4 |
| Florida | 42.5 | 1.6555 | 703.6 |
| Louisiana | 3.0 | 0.9740 | 29.2 |
| Mississippi | 4.1 | 0.0929 | 3.8 |
| | $55.1 | | $ 754.0 |
| Commercial Lines | | | |
| Alabama | $ 2.3 | 0.8124% | $ 18.7 |
| Florida | 32.0 | 2.0628 | 660.1 |
| Louisiana | 2.0 | 1.2636 | 25.3 |
| Mississippi | 1.2 | 0.5980 | 7.2 |
| | $37.5 | | $ 711.2 |
| Subtotal | $92.6 | | $1,465.3 |
| ×2% Automobile Damage Factor | | | $1,494.6 |
| Loss to Notes (assuming 55% coinsurance) | | | $ 65.07 |

Class G secures aggregate annual reinsurance protection against small to medium-sized hurricane, earthquake, and tornado/hailstorm events. The new structure is an industry-indexed structure as defined above, except that each event will contribute towards an aggregate level of protection instead of per occurrence protection and large loss events are by design excluded. One goal of this structure is to provide reinsurance protection against an unusual accumulation of small-to-medium sized catastrophic events. This aggregate annual customized index structure represents a significant innovation in the market, marking a significant advance relative to standard indemnity based aggregates and single-state structures.

For each event, the loss contributing toward the aggregate-coverage (ELC) will be defined using the EIV approach described above subject to the following terms:

1. If a Loss Event < w, $ELC_i$ = $0; else

2. Event Loss Contrib. ($ELC_i$) $= \begin{bmatrix} \$0 & \text{If } EIV_i \leq x \text{ million} \\ EIV_i - x & \text{If } \$x < EIV_i \leq \$y \text{ million} \\ (\$y - x) & \text{If } \$y < EIV_i \leq \$z \text{ million} \\ \$0 & \text{If } EIV_i > \$z \text{ million} \\ & (\text{e.g., } \$1.0 \text{ billion} \\ & EIV \text{ loss}) \end{bmatrix}$ Where w=minimum event that can contribute to the aggregate coverage (i.e., franchise deductible); x=per event deductible, y=per event contribution limit, and z=maximum event that contributes to aggregate. Each of these variables will be defined in the pricing supplement, and can be specified in either index or industry loss terms or combinations of both.

In the preferred embodiment, the following values are assigned to the aforementioned variables:
W=$100 million in industry insured losses
X=$0
Y=$150 million in indexed losses
Z=$29.5 billion in industry insured losses The aggregate annual loss index (ALI) is then equal to the sum of the individual Event Loss Contributions (ELC) during a given risk period:

$$ALI = \sum_i ELC_i$$

and the coverage terms follow a standard aggregate annual coverage:

Aggregate Annual Coverage$_t$=Max[0,Min[δ(ALI$_t$−AT),δ(AE−AT)]]

where AT is the aggregate retention trigger of the coverage, which will be set at approximately a 20-year aggregate annual return period for the covered perils with the 2006 Issuance. In the current embodiment the risk period is one year, AE is the aggregate exhaustion limit of the coverage (i.e., AE-AT signifies the coverage limit), and δ is the insurance percentage for the aggregate coverage. The above variable values and other details of the above example are presented for illustrative purposes only, they should not be considered as limiting or defining the scope of the invention, as the variables above may take on any value without departing from the spirit of the present invention.

Class G has an intermediate risk period that aligns with the calendar year instead of the anniversary dates of the offerings. In the event that the aggregate coverage is triggered, the aggregate limit will be reduced to pay for aggregate losses incurred during the year, with any remaining limit carrying over to cover losses in subsequent years of the bond. Additionally, occurrence losses may be covered under the present invention.

The payout or multi layer tail on the aggregate cover will be 18 months from the end of each calendar year risk period.

Payout factors will be specified for each peril (e.g., hurricane, earthquake, and tornado/hailstorm) but will be subject to an annual reset option.

All classes of coverage will be subject to an annual reset to adjust for changes in the underlying data, with the intent to preserve the probability of attachment and expected loss of each series of coverage. Updates to the payout factors on any series can be utilized to maintain basis risk within acceptable tolerances. In the preferred embodiment, the change in payout factors will be limited to within 20% of the original payout factors at issuance for any given state and the reset will ensure that the expected loss and probability of attachment of the coverage is held constant.

Figure 3:
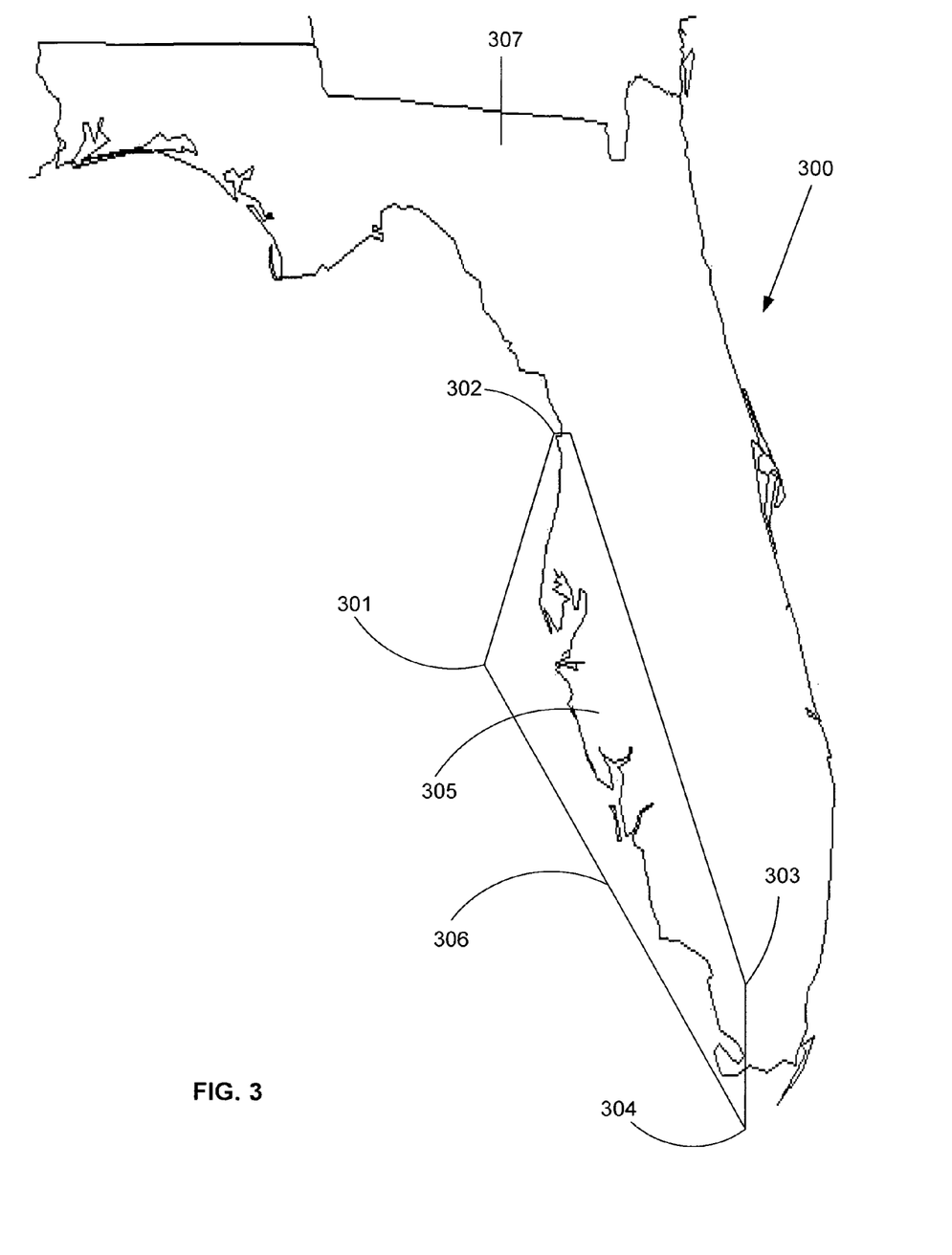
FIG. 3 is a map depicting the parametric approach of subdividing a geographic area into specific risk regions in accordance with an embodiment of the present invention.

A new feature of the present invention depicted in FIG. 3, is that the payout factors include a new geographic parametric adjustment, as shown in the regional map with the approach of sub-dividing a geographic area into specific risk regions 300. For example, in Florida 307, the hurricane payout factors for land-falling hurricanes along the selected portion of the coast 306, namely in the southwest quadrant 305 of the state 307, is defined parametrically to replicate southwest landfalls including the Florida Keys (i.e., an event making landfall along the coast between 82.8W 301, 28.17N 302 and 80.85W 303, 25.17N 304. The present invention presents the first application of a parametric approach to sub-divide state-based factors.

The present invention can also be utilized for other types of insurance, such as automobile insurance. In this case, separate automobile loads will be specified for each peril (i.e., hurricane, earthquake, and tornado/hail) within each series of coverage. Currently, the automobile load is 3% for hurricane and earthquake events and 20% for tornado/hail events. However, these terms can be modified to any range as is known in the art.

Figure 4:
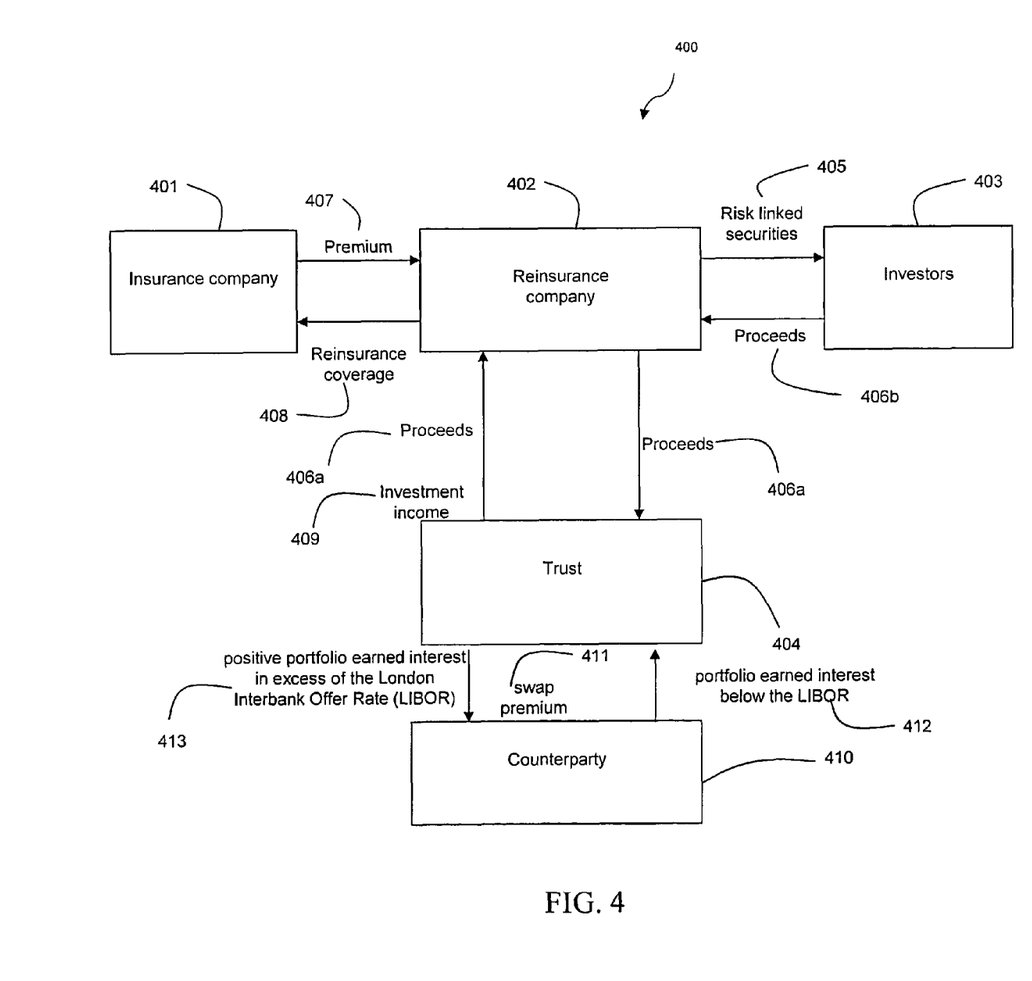
FIG. 4 is a flow chart depicting the process of funding and purchasing reinsurance coverage in accordance with an embodiment of the present invention.

FIG. 4 depicts the process of funding and purchasing reinsurance coverage. An insurance company 401 enters into a master reinsurance agreement with a special purpose reinsurance company 402. Each aspect of coverage purchased under the reinsurance agreement will take the form of an endorsement to the master reinsurance agreement. The special purpose reinsurance company 402, receives a premium 407 and in return issues reinsurance coverage 408. Each endorsement is financed by the special purpose reinsurance company 402 through the issuance of risk-linked securities 405 to investors 403 in exchange for proceeds 406b. The proceeds 406a of this issuance are deposited into a separate trust 404 to support the coverage provided. Investment income 409 on the trust funds are paid to investors 403 along with the reinsurance premium 407. When the proceeds are required as payment for coverage of a policy, the trust fund pays the proceeds 406a otherwise the proceeds are returned to the investors 403 as a return of principal at maturity. Furthermore, the trust 404 enters into a total return swap agreement with a counterparty 410 to ensure that the trust fund assets are principal protected and return an interest rate equal to the London Interbank Offered Rate (Libor). Under the swap agreement, the trust pays the swap counterparty any positive portfolio earned interest in excess of the London Interbank Offer Rate (LIBOR) 413 on the trust assets along with a swap premium 411 included in the reinsurance premium 407 paid by the Ceding Insurance Company. In return, the counterparty pays the trust any negative portfolio earned interest below the LIBOR 412 on the trust asset returns. Reinsurance coverage included as part of the reinsurance agreement includes both "per occurrence" coverage and an annual aggregate coverage.

The coverage provided under the terms of each endorsement to the reinsurance agreement mirrors the payment terms of the risk-linked securities supporting the provisions of coverage (i.e., customized index) with the exception of an additional ultimate net loss provision ("UNL"). The UNL provision is added to the reinsurance agreement to ensure that recoveries under the coverage cannot result in a negative net loss to the insurance company for any given event or series of events. In the unlikely event that the UNL provision results in a repayment to the special purpose reinsurance company, the reinsurance agreement has a provision to reinstate the coverage for the insurance company under comparable terms as the original coverage with a limit equal to the UNL repayment amount for a period of 3 years.

Figure 5:
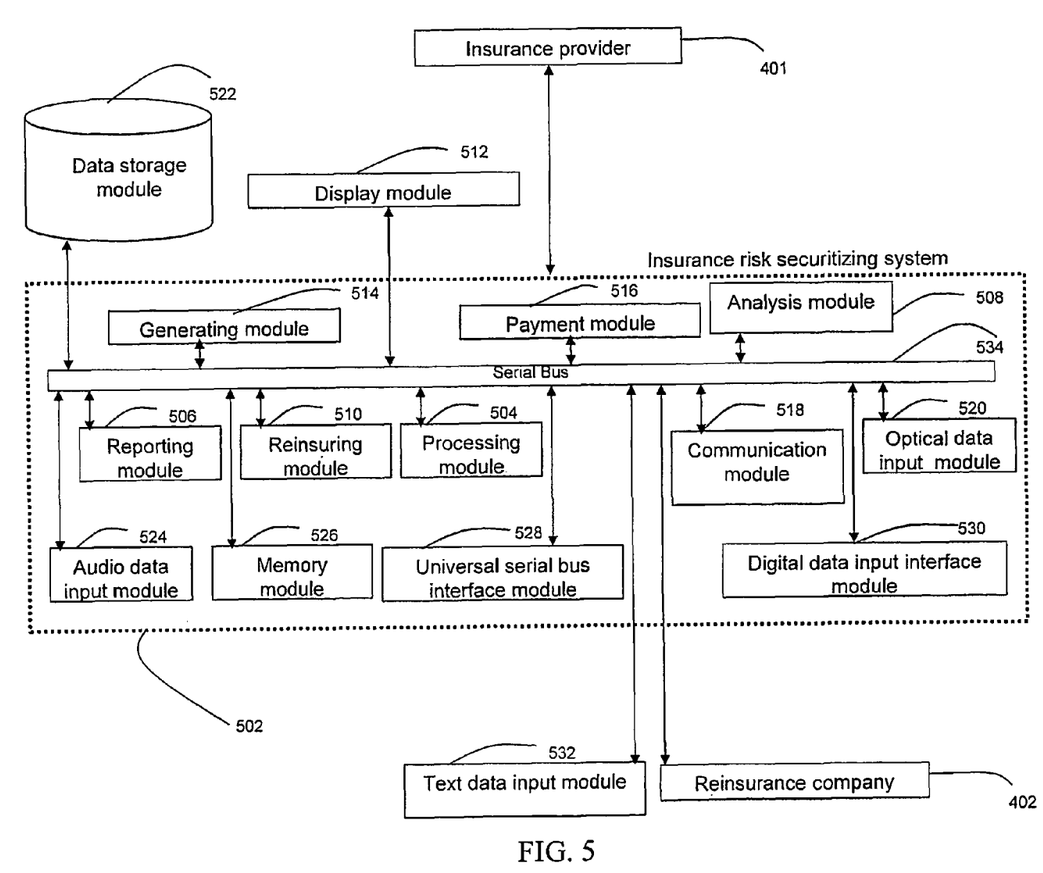
FIG. 5 is a diagram depicting a system on which the present invention may be implemented in accordance with an embodiment of the present invention.

The structure of the agreement is such that it allows issuance of the 4-quarter anniversary dates using a stump payment paid between issuance and the quarter commencement to compensate for the additional term. Periodic event reports and notices are available to all of the interested parties (i.e., the insurance company, the reinsurance company, and the investors in the underlying security). FIG. 5 depicts a system on which the present invention may be implemented in accordance with an embodiment of the present invention. The present invention relates to an index and risk linked securitization structure system, apparatus and method which includes at least one central processing computer or computer network server. Network server includes at least one controller or central processing unit (CPU or processor), at least one communication port or hub, at least one random access memory (RAM), at least one read-only memory (ROM) and one or more databases or data storage devices. All of these later elements are in communication with the CPU to facilitate the operation of the network server. The network server may be configured in many different ways. For example, network server may be a conventional standalone server computer or alternatively, the function of server may be distributed across multiple computing systems and architectures.

Network server may also be configured in a distributed architecture, wherein databases and processors are housed in separate units or locations. Some such servers perform primary processing functions and contain at a minimum, a RAM, a ROM, and a general controller or processor. In such an embodiment, each of these servers is attached to a communications hub or port that serves as a primary communication link with other servers, client or user computers and other related devices. The communications hub or port may have minimal processing capability itself, serving primarily as a communications router. A variety of communications protocols may be part of the system, including but not limited to: Ethernet, SAP, SAS™, ATP, Bluetooth, GSM and TCP/IP.

Data storage device may include a hard magnetic disk drive, optical storage units, CD-ROM drives, or flash memory. Data storage device contains databases used in processing transactions and/or calculations in accordance with the present invention, including at least an insurance subscriber database and an insurance database. In one embodiment, database software creates and manages these databases. Insurance related calculations and/or algorithms of the present invention are stored in storage device and executed by the CPU.

The controller comprises a processor, such as one or more conventional microprocessors and one or more supplementary co-processors such as math co-processors. The processor is in communication with a communication port through which the processor communicates with other devices such as other servers, user terminals or devices. The communication port may include multiple communication channels for simultaneous communication with, for example, other processors, servers or client terminals. As stated, devices in communication with each other need not be continually transmitting to each other. On the contrary, such devices need only transmit to each other as necessary, may actually refrain from exchanging data most of the time, and may require several steps to be performed to establish a communication link between the devices.

The processor also is in communication with a data storage device. The data storage device may comprise an appropriate combination of magnetic, optical and/or semiconductor memory, and may include, for example, RAM, ROM, flash drive, an optical disc such as a compact disc and/or a hard disk or drive. The processor and the data storage device each may be, for example, located entirely within a single computer or other computing device; or connected to each other by a communication medium, such as a USB port, serial port cable, a coaxial cable, an Ethernet type cable, a telephone line, a radio frequency transceiver or other similar wireless or wireline medium or combination of the foregoing.

The data storage device may store, for example, (i) a program (e.g., computer program code and/or a computer program product) adapted to direct the processor in accordance with the present invention, and particularly in accordance with the processes described in detail hereinafter with regard to the controller; (ii) a database adapted to store information that may be utilized to store information required by the program. The database includes multiple records, each record includes fields that are specific to the present invention such as interest rates, premiums, subscribers, payouts, claims, etc.

The program may be stored, for example, in a compressed, an uncompiled and/or an encrypted format, and may include computer program code. The instructions of the program may be read into a main memory of the processor from a computer-readable medium other than the data storage device, such as from a ROM or from a RAM. While execution of sequences of instructions in the program causes the processor to perform the process steps described herein, hard-wired circuitry may be used in place of, or in combination with, software instructions for implementation of the processes of the present invention. Thus, embodiments of the present invention are not limited to any specific combination of hardware and software.

Suitable computer program code may be provided for performing numerous functions such as establishing one or more risk classes (each risk class representing one or more risks), designing a security product tied to each risk class, providing a return on an investment, indexing the security product to industry losses to quantify risk on a customized index to compute losses and determine a return on the investment, etc. The functions described above are merely exemplary and should not be considered exhaustive of the type of function which may be performed by the computer program code of the present inventions.

The computer program code required to implement the above functions (and the other functions described herein) can be developed by a person of ordinary skill in the art, and is not described in detail herein.

All of the modules described herein are operably interconnected via a bi-directional connection with a central serial bus 534. The serial bus 534 serves to receive information from every single module, as well as to transmit information from one module to another.

The insurance company 401 receives and transits information to and from the insurance risk securitizing system 502 via any standard means known in the art. The insurance risk securitizing system 502 comprises: a processing module 504 for establishing one or more risk classes (each risk class representing one or more risks), identifying, insurance company exposure and industry exposure, determining an index-based company loss, adjusting payout factors periodically, purchasing additional coverage, computing a state hedge factor, and computing at least one payout factor.

The insurance risk securitizing system 502 further comprises: a reporting module 506 for issuing a security product tied to each risk class, estimating actual ex post basis risk on an index-based coverage, applying the risk that actual industry losses from an event to an official estimate of industry losses, leveraging an official estimate of industry losses for an event using either at least one payout factor and/or a state hedge factor, and providing a return on an investment.

Additionally, the insurance risk securitizing system 502 comprises: an analysis module 508 for indexing the security product to industry losses to quantify risk on a customized index to compute losses, analyzing basis risk on daily basis, determine a return on the investment, modeling losses of an insurance company and losses of the industry, determining the payout on an index-based reinsurance coverage, making a comparison of company losses and industry loss for at least one event, comparing company and industry losses by event, and computing line-of-business hedge or payout factors. Furthermore, the insurance risk securitizing system 502 comprises: a reinsuring module 510 for ceding at least one risk associated with the security product to at least one reinsurance company 402, and a display module 512.

Additionally, the insurance risk securitizing system 502 includes: a communication module 518 for bi-directional communication with external and telecommunications systems, a data storage module 522 for storing and managing digital information, a text data input module 532 for inputting data in the form of text, and an optical data input module 520 for converting to digital format documents and images and inputting them into the insurance risk securitizing system 502.

Finally, the insurance risk securitizing system 502 includes: an audio data input module 524 for receiving and inputting audio information, a memory module 526 for temporarily storing information as it is being processed by the processing module 504, a universal serial bus interface module 534 for receiving and transmitting data to and from devices capable of establishing a universal serial bus connection, and a digital data input interface module 530 for receiving data contained in digital storage devices (e.g. floppy disk, zip drive, 8 mm digital tape, etc).

The term "computer-readable medium" as used herein refers to any medium that provides or participates in providing instructions to the processor of the computing device (or any other processor of a device described herein) for execution. Such a medium may take many forms, including but not limited to, non-volatile media, volatile media, and transmission media. Non-volatile media include, for example, optical or magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, a carrier wave as described hereinafter, or any other medium from which a computer can read.

Various forms of computer readable media may be involved in carrying one or more sequences of one or more instructions to the processor (or any other processor of a device described herein) for execution. For example, the instructions may initially be borne on a magnetic disk of a remote computer. The remote computer can load the instructions into its dynamic memory and send the instructions over an Ethernet connection, cable line, or even telephone line using a modem. A communications device local to a computing device (or, e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Servers of the present invention may also interact and/or control one or more user devices or terminals. The user device or terminal may include any one or a combination of a personal computer, a mouse, a keyboard, a computer display, a touch screen, LCD, voice recognition software, or other generally represented by input/output devices required to implement the above functionality. The program also may include program elements such as an operating system, a database management system and "device drivers" that allow the processor to interface with computer peripheral devices (e.g., a video display, a keyboard, a computer mouse, etc).

The current invention allows the ceding insurer to dynamically adjust the individual state and line of business payout factors annually during the life of the coverage by as much as 20% from the original value so as to more closely manage the basis risk of the coverage as industry and company exposure data changes. The original customized-index reinsurance structure locked the payout factors throughout the life of the coverage at their initial values.

The customized index structure is extended for either occurrence or aggregate excess-of-loss reinsurance, by combining parametric factors with the individual state and line-of-business payout factors to define sub-state payout factors for any given line of business. The parametric-index structure allows firms to manage portfolio replications at a finer level of geographic resolution—minimizing basis risk and providing an enhanced securitization product.

The invention allows estimating and designing the payout factors, in combination or separate from parametric adjustments, to create a replicating portfolio and to measure the basis risk inherent in the coverage structure. The invention also includes the methods, procedures, and analytics for dynamically adjusting payout factors over time on any existing coverage to reflect changes in industry and company exposure data and other factors pertinent to the underlying industry and/or company loss/exposure profiles.

Further, the current invention allows the payout factors to change during the course of the coverage period within defined limits and defined reset intervals so as to allow the ceding insurance company to dynamically manage basis risk as both industry exposures and company exposures change over time.

The factor proportions are selected so as to minimize the sum of squared errors between company losses and modeled industry losses in the area of subject losses (e.g., losses with a return period between 100 and 350 years), while at the same time meeting a statistical criteria to minimize basis risk across the entire structure.

All classes of coverage will be subject to an annual reset to adjust for changes in the underlying data, with the intent to preserve the probability of attachment and expected loss of each series of coverage. Updates to the payout factors on any series can be utilized to maintain basis risk within acceptable tolerances. In the preferred embodiment, the change in payout factors will be limited to within 20% of the original payout factors at issuance for any given state and the reset will ensure that the expected loss and probability of attachment of the coverage is held constant.

Figure 6:
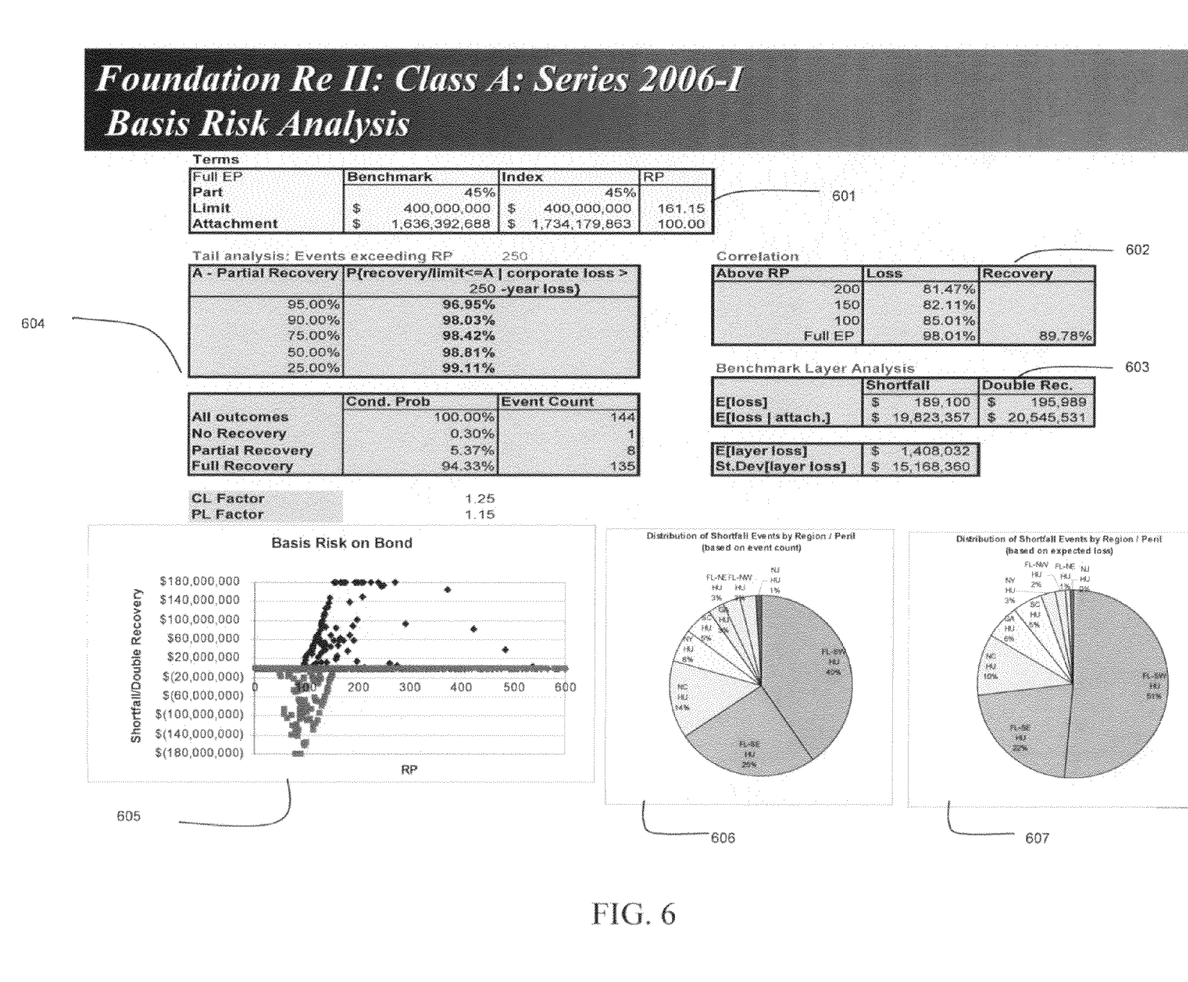
FIG. 6 is a diagram depicting an example of basis risk analysis in accordance with an embodiment of the present invention.

FIG. 6 depicts an example of basis risk analysis in accordance with an embodiment of the present invention. FIG. 6 shows a standardized output report on the terms of basis risk analysis 601, as well as a chart of the loss/recovery correlation 602. FIG. 6 further depicts a chart of the benchmark layer analysis 603, a chart of events exceeding partial recovery 604, and a graph of the basis risk on a bond vs. shortfall double recovery 605. Finally, FIG. 6 depicts a pie chart of the distribution of shortfall events by region/peril based on event count 606 and a pie chart of the distribution of shortfall events by region/peril based on expected loss 607.

FIG. 6 is a singular example of a standardized output report on basis risk associated with the present invention. However, FIG. 6 provides a clear illustration of the type of output, and hence analytical algorithms, embodied in the systems, methods, and procedures in the current invention. Leveraging these systems, methods, and procedures enables a primary insurance company to develop and test the ability of the payout factors, alone or in combination with parametric adjustments, to accurately replicate the experience of the insurance company's portfolio on a customized index basis. For example, the output metrics incorporated in FIG. 6 illustrate the functionality provided to an insurance company within the current invention, including robust statistical tests of correlation between indexed and company losses, estimates of the statistical confidence of repayment across various levels of repayment expectation, and an ability to drill down on the distribution of specific events where indexed losses and expected company losses may diverge. The capacity to dynamically evaluate these measures over time is a critical aspect of the current invention—allowing for innovative execution of the current and future reinsurance structures on time scales ranging from quarters to days.

The basic structure of the customized-index reinsurance coverage is to use individual state and individual line-of-business payout factors, along with a set of algorithms and procedures, that, when multiplied against reported or modeled industry losses, closely replicate the loss experience of an individual insurance company's portfolio of property-casualty insurance. The present invention extends the basic structure of this customized-index approach, as well as the shelf structure used to access new reinsurance coverage through the special purpose reinsurance company in many dimensions.

The current invention allows the ceding insurer to purchase coverage for various combinations of geographic region and/or line of business coverage using the same shelf structure by simply setting payout factors to zero for any coverage combinations not desired by the ceding insurer prior to issuance.

The current invention allows the ceding insurer to dynamically adjust the individual state and line of business payout factors annually during the life of the coverage by a predetermined amount so as to more closely manage the basis risk of the coverage as industry and company exposure data changes. The original customized-index reinsurance structure locked the payout factors throughout the life of the coverage at their initial values.

The present invention also extends the basic per occurrence nature of customized-indexed catastrophe bonds to aggregate excess-of-loss reinsurance, written as an aggregate annual cover or a cumulative multi-year coverage, with aggregate retentions and limits. While aggregate reinsurance coverage has been obtained through risk-linked security transactions on an indemnity basis, this invention extends the concept of aggregate excess-of-loss reinsurance and the customized-index approach to create a new innovation in reinsurance coverage.

Also included in the invention, both with respect to per occurrence and aggregate excess-of-loss reinsurance, is that the terms of the reinsurance may or may not include various features that alter the terms of coverage. These terms include, but are not limited to, per event loss contribution limits, franchise deductibles, per event loss deductibles, knock-out or knock-in loss provisions, adjustments to reflect net vs. gross insurance company exposure, and adjustments for mom-modeled losses such as automobile losses or loss adjustment expenses.

The current invention also provides additional classes of coverage, including coverage for losses from U.S. tornado and/or hailstorm events, alone or in combination with coverage for hurricane and/or earthquake insured losses. The risk classes of the present invention may be adjusted annually by the insurance provider in order to more accurately reflect real life conditions. To date, no risk-linked securities transaction in the United States has included the separate peril of U.S. tornado and/or hailstorm. This current invention is the first structure to provide a commercially viable definition of U.S. tornado-hailstorm event on an index basis. The definition leverages both the definition of PCS Wind and Thunderstorm Events and PCS Winter Storm Events, where the latter is limited to the losses in states that experience qualifying severe weather (as defined by 5 or more tornado and/or hail storm reports within each state).

Further, the invention is the first to utilize measurable physical parameters by state or other geography in combination with reported industry losses and/or indexed losses and/or PCS loss classifications by state/region and line of business relative to a predetermined loss threshold to define a given covered event (e.g., U.S. tornado/hailstorm losses within PCS Winter Storm events).

The invention also extends the customized index structure, for either occurrence or aggregate excess-of-loss reinsurance, by combining parametric factors with the individual state and line-of-business payout factors to define sub-state payout factors for any given line of business. This innovation of a parametric-index structure is critically valuable for ceding companies in that the structure allows firms to manage portfolio replications at a finer level of geographic resolution—minimizing basis risk and providing an enhanced securitization product.

Figure 7:
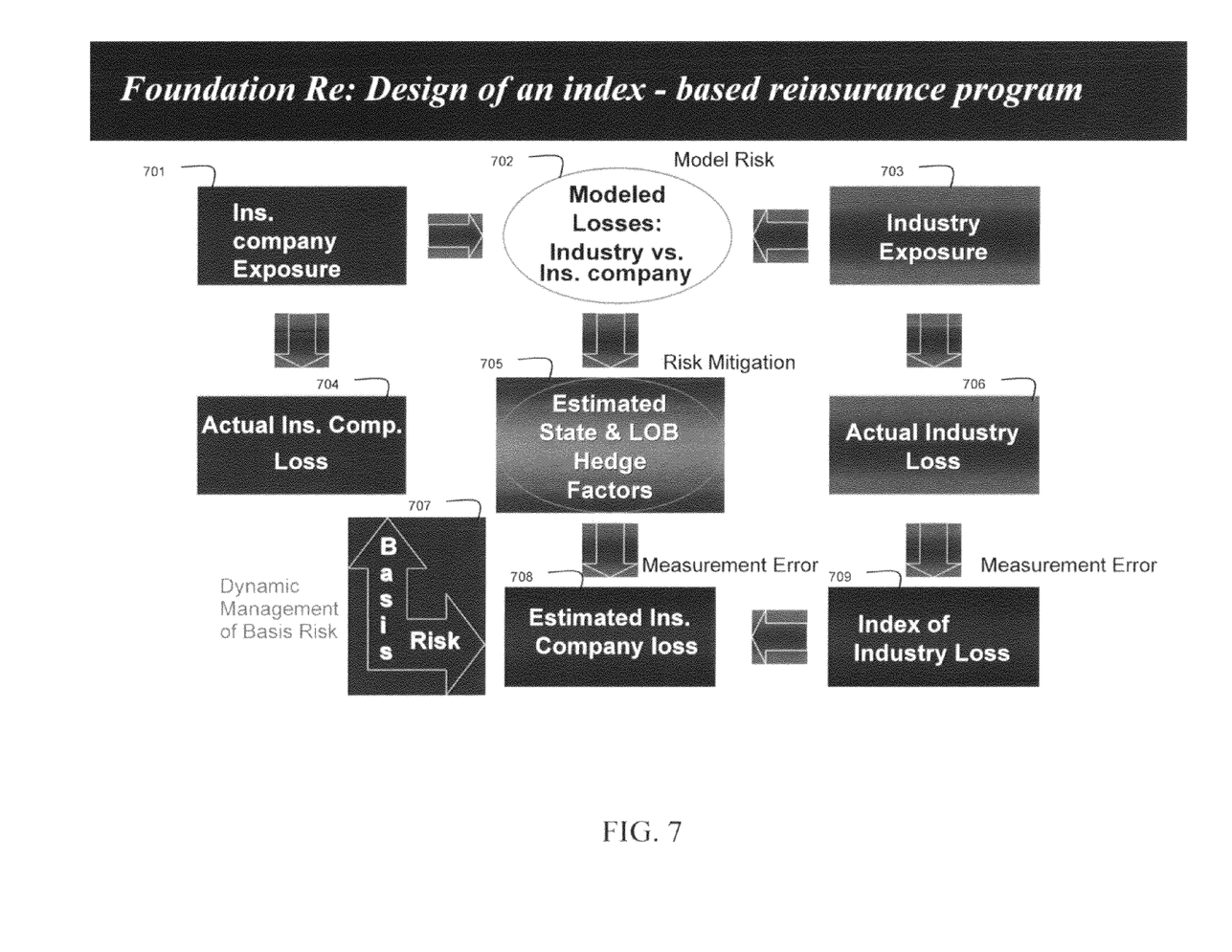
FIG. 7 is a diagram depicting an example of index-based reinsurance program in accordance with an embodiment of the present invention.

FIG. 7 depicts an illustration of the system, methods, and procedures that embody the index-based reinsurance program in the present invention. The index-based reinsurance program first takes into account company exposure 701 and industry exposure 703. Then, using a consistent stochastic catastrophe event matching simulation engine 702, models the losses of the company and the losses of the industry across a wide array of simulated loss events—providing a comparison of company losses and industry loss for each event state (sub-state) and line of business combination. Comparing company and industry losses by event—state (or regional sub-state)-line of business 705, then leverages system algorithms for computing state (or sub-state) and line-of-business hedge or payout factors designed to translate industry losses into a replicating portfolio of company losses ensuring a minimization of a prior expected basis risk.

For a given event, the magnitude of the industry loss 706 is a function of the characteristics of the event and the industry exposure 703. Leveraging both sets of information, an official estimate of industry losses for an event is developed by the Property Claims Services in 709. The payout factors developed in 705 are applied to this estimate of industry loss 709 to determine the index-based company loss 708, and hence the payout on the index-based reinsurance coverage. The actual ex post basis risk 707 on the index-based coverage is estimated by comparing actual company losses for an event 704 with the index-based company loss 708.

Since the payout factors developed in 705 are applied to an official estimate of industry losses 709, the potentially significant model risk associated with the catastrophe risk simulation engine (i.e., the risk that actual industry losses from an event are significantly different than the event losses projected by catastrophe models) is limited to the relativity between industry and company losses for a given event. As is known in the art, this mitigation of model risk is a key aspect of a customized index reinsurance structure as the catastrophe risk models have historically underestimated actual event losses by a significant margin. As a further analytical step in FIG. 7, a comparison of actual company losses 704 and estimated insurance company (i.e., indexed losses) 708, is performed for all large historical industry loss events 709, to evaluate the measurement of basis risk 707.

Based on the present invention as depicted in FIG. 7, an insurance company can dynamically manage basis risk through time to reflect changes in insurance company exposure 701, industry exposure 703, and industry 709 and company 704 loss experience. Given them flexibility to adjust payout factors periodically and the ability to purchase additional coverage from the program shelf structure as needed, this ability to dynamically manage basis risk becomes an important asset for an insurance company in managing the overall utilization of reinsurance and capital.

While the present invention has been described with reference to the preferred embodiment and alternative embodiments, which have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. A system for securitizing insurance risk, comprising:
   one or more insurance data storage devices storing data including individual geographic region data and line-of-business industry loss data;
   one or more computer processors;
   an insurance memory in communication with the one or more computer processors and storing insurance program instructions, the one or more computer processors operative with the insurance program instructions to:
   establish for a security product, terms including one or more risk classes, each risk class representing one or more risks, and a coverage period for the security product;
   relate the terms of the security product to the individual geographic region data and line-of-business industry loss data using a numerical index EIV (Event Index Value), wherein EIV is equal to a product of an automobile load factor and the following expression for at least two lines of business:

$$\left( \sum_s \prod_s I_s^P \sum_s X_s I_s^C \right)$$

where:
   I is a loss index by individual geographic region;
   s indicates the individual geographic region;
   p indicates that the line of business is personal lines;
   c indicates that the line of business is commercial lines;
   $\Pi$ and $\chi$ are payout factors for an insurance provider for each individual geographic region and line of business for a given risk class and series of the security product;

wherein said numerical index includes the payout factors for selected combinations of individual geographic region and line of business for the at least one of said one or more risk classes, wherein said payout factors are adjustable during the coverage period of the security product and are determined based on the individual geographic region data and the line of business industry loss data for an event occurring during the coverage period of the security product, and wherein said payout factors are for use with at least a reported industry loss for determining payout amounts for a covered event; and
   compute losses associated with said at least one or more risk classes, and determine a return on said security product, based on the numerical index and the payout factors.

2. The system of claim 1 wherein said numerical index quantifies risk based on variables selected from a group consisting of aggregate losses, occurrence losses, personal lines, and commercial lines.

3. The system of claim 1 wherein said one or more risk classes include a plurality of risk classes each representing a combination of natural catastrophe risks selected from a group consisting of: hurricane, earthquake, hurricane and earthquake, and tornado/hailstorm as part of a wind and thunderstorm or winter storm event, individually or in combination with other perils.

4. The system of claim 3 wherein said risk class of tornado/hailstorm is defined as any event that is identified and assigned a number by an agency, wherein said agency identifies a storm family as either a wind and thunderstorm event with secondary perils of tornado and hailstorm, or a winter storm with secondary perils of tornado and hailstorm, wherein a payout factor is set to zero if the area damaged by said event fails to meet specified conditions for qualifying severe weather in an affected covered area.

5. The system of claim 3 wherein each said natural catastrophe risk contributes towards an aggregate level of protection, wherein said aggregate level of protection is an excess of loss cover.

6. The system of claim 5 wherein each of said natural catastrophe risks is subject to at least one of the following: per event contribution limits, franchise deductibles, minimum and maximum industry limits and aggregate retentions.

7. The system of claim 3 wherein each said natural catastrophe risk is subject to at least one of the following: a minimum and a maximum industry loss thresholds.

8. The system of claim 1 wherein said one or more risk classes categorize natural catastrophe risks by region or by time period.

9. The system of claim 1 wherein the one or more computer processors are operative with the insurance program instructions to modify said numerical index to take into account a specific class of risk at a sub-geographic level through the utilization of one or more trigger criteria defined by reference to said numerical index.

10. The system of claim 1 further comprising a reinsuring module configured to cause the ceding of at least one risk associated with said security product to at least one reinsurance provider.

11. The system of claim 1 wherein said security product provides at least partial coverage for a property and casualty insurance policy.

12. The system of claim 1, wherein the one or more computer processors operative with the insurance program instructions to relate the terms of the security product to individual geographic region data and line-of-business industry loss data further comprises combining parametric factors with the payout factors to define geographic region payout factors for selected lines of business.

13. A computer implemented method of securitizing insurance risk, comprising:
   accessing, by the one or more computer processors, from one or more insurance data storage devices, data including individual geographic region data and line of business industry loss data;
   establishing for a security product, by one or more computer processors, terms including one or more risk classes, each risk class representing one or more risks and a coverage period for the security product;
   generating, by the one or more computer processors, a relationship between the terms of the security product and the individual geographic region data and line-of-business industry losses using a numerical index EIV (Event Index Value), wherein EIV is equal to a product of an automobile load factor and the following expression for at least two lines of business:

$$\left( \sum_s \prod_s I_S^P \sum_s X_s I_S^C \right)$$

where:
   I is a loss index by individual geographic region;
   s indicates the individual geographic region;
   p indicates that the line of business is personal lines;
   c indicates that the line of business is commercial lines;
   Π and Ω are payout factors for an insurance provider for each geographic region and line of business for a given risk class and series of the security product,
   wherein the numerical index includes the payout factors for selected combinations of individual geographic region and line of business for the at least one of said one or more risk classes, wherein said payout factors are adjustable during the coverage period of the security product and are determined based on the individual geographic region data and the line of business industry loss data for an event occurring during the coverage period of the security product, and wherein said payout factors are for use with at least a reported industry loss for determining payout amounts for a covered event; and
   computing, by the one or more computer processors, losses and a return on said security product, based on said numerical index and the payout factors.

14. The method of claim 13 wherein the numerical index is at least partially tied to an occurrence of an event for a corresponding represented risk.

15. The method of claim 13 wherein the numerical index is used to quantify risk based on variables selected from a group consisting of aggregate losses.

16. The method of claim 13 wherein each risk class further comprises an event meeting a predetermined impact threshold.

17. The method of claim 16 wherein each event contributes towards an aggregate level of protection, wherein the aggregate level of protection is an excess of loss annual cover.

18. The method of claim 13 wherein the one or more risk classes include a plurality of risk classes each representing a combination of natural catastrophe risks selected from a group consisting of the following perils: hurricane, earthquake, hurricane and earthquake, and tornado and/or hailstorm as part of a wind and thunderstorm or winter storm event, individually or in combination with other perils.

19. The method of claim 13 further comprising the step of issuing new classes whether or not an event notice has been triggered on an existing outstanding class of risk.

20. The method of claim 13 further comprising the step of issuing event notices and taking actions related to one particular event but not all events at the same time.

21. The method of claim 13 further comprising the step of parametrically adjusting, by an analysis module, various payout factors for pre-specified geographical regions.

22. The method of claim 13 wherein the numerical index is further modified to take into account a specific class of risk at a sub-geographic level through the utilization of one or more trigger criteria defined by reference to the numerical index.

23. The method of claim 13 further comprising the step of ceding at least one risk associated with said security product to at least one reinsurance provider using a reinsuring module.

24. The method of claim 13 wherein the security product provides at least partial coverage for a property and casualty insurance policy.

25. A system for securitizing insurance risk, comprising:
   one or more insurance data storage devices storing data including individual geographic region and line-of-business industry loss data;
   one or more computer processors in communication with the one or more insurance data storage devices;
   an insurance memory in communication with the one or more computer processors and storing program instructions, which program instructions, when executed by the one or more computer processors, cause the one or more computer processors to:
   establish for a security product terms including one or more risk classes, each risk class representing one or more risks, and a coverage period for the security product;
   relate the terms of said security product to individual geographic region and line-of-business industry loss data to quantify risk using a numerical index EIV (Event Index Value), wherein EIV is equal to a product of an automobile load factor and the following expression for at least two lines of business:

$$\left( \sum_s \prod_s I_S^P \sum_s X_s I_S^C \right)$$

where:
   I is a loss index by geographic region;
   s indicates the individual geographic region;
   p indicates that the line of business is personal lines;

c indicates that the line of business is commercial lines;
Π and χ are payout factors for an insurance provider for each geographic region and line of business for a given risk class and series of the security product, wherein said numerical index includes the payout factors for selected combinations of individual geographic region and line-of-business, wherein said payout factors are adjustable during the coverage period of the security product and are determined based on the individual geographic region data and the line of business industry loss data for an event occurring during the coverage period of the security product, and wherein said payout factors are for use with at least a reported industry loss for determining payout amounts for a covered event; and modify said numerical index to take into account a specific class of risk at a sub-geographic level through the utilization of the payout factors of the numerical index;

wherein said one or more risk classes include a plurality of risk classes each representing a combination of natural catastrophe risks selected from a group consisting of: hurricane, earthquake, hurricane and earthquake, wind and thunderstorm, tornado, hailstorm, tornado and hailstorm, and tornado and hailstorm as part of winter storm losses, individually or in combination with other perils.

* * * * *